US009069748B2

(12) United States Patent
Folting et al.

(10) Patent No.: US 9,069,748 B2
(45) Date of Patent: Jun. 30, 2015

(54) SELECTIVE GENERATION AND DISPLAY OF DATA ITEMS ASSOCIATED WITH A SPREADSHEET

(75) Inventors: Allan Folting, Redmond, WA (US);
Stephen Van de Walker Handy, Bremerton, WA (US); Diego M. Oppenheimer, Seattle, WA (US); Anatoly V. Grabar, Redmond, WA (US); Amit A. Velingkar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/252,412

(22) Filed: Oct. 4, 2011

(65) Prior Publication Data

US 2013/0086459 A1 Apr. 4, 2013

(51) Int. Cl.
G06F 17/00 (2006.01)
G06F 17/24 (2006.01)
G06F 17/30 (2006.01)

(52) U.S. Cl.
CPC ........ *G06F 17/246* (2013.01); *G06F 17/30569* (2013.01)

(58) Field of Classification Search
CPC .................................................. G06F 17/246
USPC ................................................ 715/212, 214
See application file for complete search history.

(56) References Cited

U.S. PATENT DOCUMENTS

| 5,272,628 | A | 12/1993 | Koss |
| 5,675,637 | A | 10/1997 | Szlam |
| 5,680,618 | A | 10/1997 | Freund |
| 5,689,703 | A | 11/1997 | Atkinson et al. |
| 5,729,730 | A | 3/1998 | Wlaschin et al. |
| 5,832,473 | A | 11/1998 | Lee |
| 5,838,965 | A | 11/1998 | Kavanagh et al. |
| 5,856,826 | A | 1/1999 | Craycroft et al. |
| 5,894,311 | A | 4/1999 | Jackson et al. |
| 5,926,806 | A | 7/1999 | Marshall et al. |
| 5,953,730 | A | 9/1999 | Schawer et al. |
| 5,956,422 | A | 9/1999 | Alam et al. |
| 6,026,392 | A | 2/2000 | Kouchi et al. |
| 6,078,924 | A | 6/2000 | Ainsbury |

(Continued)

FOREIGN PATENT DOCUMENTS

CN 101908040 A 12/2010
CN 102067117 A 5/2011

OTHER PUBLICATIONS

Johnson, Steve. Excerpts of "Microsoft Excel 2010 on Demand". Publishing Date: Jun. 22, 2010.*

(Continued)

*Primary Examiner* — Laurie Ries
(74) *Attorney, Agent, or Firm* — Damon Rieth; Jim Ross; Micky Minhas (57) ABSTRACT

A system and method for creating a report in a spreadsheet is disclosed. The system and method identifies a source of data items associated with the spreadsheet. The data items that are associated with the report that is generated in the spreadsheet are identified. A display including a field pane with an active tab and an all tab. The active tab displaying those data items that are determined to be associated with the report that is being generated in the spreadsheet. The all tab displaying all of the data items associated with the spreadsheet.

20 Claims, 12 Drawing Sheets

(56) References Cited

U.S. PATENT DOCUMENTS

| | | |
|---|---|---|
| 6,112,199 A | 8/2000 | Nelson |
| 6,134,564 A | 10/2000 | Listou et al. |
| 6,313,848 B1 | 11/2001 | Hoag |
| 6,349,315 B1 | 2/2002 | Sonoyama et al. |
| 6,411,959 B1 | 6/2002 | Kelsey |
| 6,626,959 B1 | 9/2003 | Moise |
| 6,691,281 B1 | 2/2004 | Sorge et al. |
| 7,146,381 B1 | 12/2006 | Allen et al. |
| 7,165,214 B2 | 1/2007 | Ishizaka |
| 7,509,320 B2 | 3/2009 | Hess |
| 7,565,613 B2 | 7/2009 | Forney |
| 7,647,551 B2 | 1/2010 | Vigesaa |
| 7,693,860 B2 | 4/2010 | Babanov et al. |
| 8,108,431 B1 | 1/2012 | Guner et al. |
| 8,718,364 B2 * | 5/2014 | Enomoto ................ 382/173 |
| 2003/0093362 A1 | 5/2003 | Tupper |
| 2004/0049730 A1 | 3/2004 | Ishizaka |
| 2004/0103365 A1 | 5/2004 | Cox |
| 2004/0117358 A1 * | 6/2004 | von Kaenel et al. ........... 707/3 |
| 2005/0149911 A1 | 7/2005 | Nadon et al. |
| 2005/0246360 A1 | 11/2005 | Tanny |
| 2006/0117051 A1 | 6/2006 | Chin |
| 2006/0173862 A1 | 8/2006 | Sauermann |
| 2006/0184410 A1 | 8/2006 | Ramamurthy |
| 2007/0061369 A1 | 3/2007 | Folting et al. |
| 2007/0073697 A1 | 3/2007 | Woods |
| 2007/0150385 A1 * | 6/2007 | Ode ........................... 705/30 |
| 2008/0046803 A1 * | 2/2008 | Beauchamp et al. ......... 715/212 |
| 2009/0018996 A1 | 1/2009 | Hunt et al. |
| 2009/0044089 A1 | 2/2009 | Gur |
| 2009/0049080 A1 | 2/2009 | Nadon et al. |
| 2009/0182702 A1 * | 7/2009 | Miller ......................... 706/60 |
| 2009/0228776 A1 | 9/2009 | Folting et al. |
| 2009/0254572 A1 | 10/2009 | Redlich et al. |
| 2009/0276692 A1 | 11/2009 | Rosner |
| 2010/0205521 A1 | 8/2010 | Folting |
| 2010/0228752 A1 | 9/2010 | Folting |
| 2011/0010324 A1 | 1/2011 | Bolivar et al. |
| 2011/0238555 A1 * | 9/2011 | Rosenthal ..................... 705/37 |
| 2012/0096389 A1 * | 4/2012 | Flam et al. .................... 715/777 |
| 2012/0110515 A1 * | 5/2012 | Abramoff et al. ............ 715/854 |
| 2012/0210251 A1 * | 8/2012 | Abrams et al. ............... 715/753 |
| 2013/0080930 A1 * | 3/2013 | Johansson .................... 715/760 |
| 2013/0086460 A1 | 4/2013 | Folting et al. |
| 2013/0132861 A1 | 5/2013 | Kienzle et al. |

OTHER PUBLICATIONS

Racheria et al. Excerpts from "IBM System Storage DS3500 Introduction and Implementation Guide". Copyright Date: May 20, 2011.*

Oldenburg, Michael. Excerpts of "Using Microsoft OneNote 2010"; Publishing Date: Sep. 6, 2011.*

Jones, Brian; Document Assembly Solution for SpreadsheetML, Nov. 4, 2008, 8 pages.

OLAP and OLAP Server Definitions, OLAP Council copyright 1995, 9 pages.

Technical Overview of Information Bridge Framework, MSDN Microsoft, published May 2004, 16 pages.

Lambert et al., excerpts from "Microsoft Access 2010 Step by Step," Copyright Date: Jul. 13, 2010.

Non-Final Office Action for U.S. Appl. No. 13/252,450 mailed Mar. 7, 2013.

What is spreadsheet?, accessed at http://www.webopedia.com/TERM/S/spreadsheet.html, accessed on Aug. 11, 2011, 2 pages Copyright Date: 2011.

International Search Report and Written Opinion for PCT/US2012/058637 mailed Mar. 15, 2013.

International Search Report and Written Opinion for PCT/US2012/058667 mailed Mar. 28, 2013.

Final Office Action for U.S. Appl. No. 13/252,450 mailed Oct. 3, 2013.

"First Office Action and Search Report Issued in Chinese Patent Application No. 201210377077.1", Mailed Date: Dec. 26, 2014, 12 Pages. (MS# 333833.03).

Notice of Allowance for U.S. Appl. No. 13/252,450 mailed Nov. 17, 2014.

Non-Final Office Action for U.S. Appl. No. 13/252,450 mailed May 20, 2014.

"Just-in-time Learning-Excel2010 Marketing Strategy and Analysis Practice Treasure", In Heng Shengjie Information Science Press, Jan. 1, 2011, 10 Pages.

"First Office Action and Search Report Issued in Chinese Patent Application No. 201210378724.0", Mailed Date: Feb. 6, 2015, 15 Pages.

Wang, Haibo, "Word/Excel 2007, Efficient Office Operation, from Beginner to Master", In 331 China Railway Publishing House, Apr. 30, 2009, pp. 322-331.

* cited by examiner

SELECTIVE GENERATION AND DISPLAY OF DATA ITEMS ASSOCIATED WITH A SPREADSHEET

BACKGROUND

Data summary tables in spreadsheets can be used to analyze large amounts of data. A data summary table provides an efficient way to display and summarize data that is supplied by a database program or that is in a data listing of a spreadsheet. A user can select fields of the data to include within filter regions, row, column, or data regions of the data summary table and can choose aggregation functions such as the sum, variance, count, and standard deviation to be displayed for selected data fields. Data in a database that can be queried from within a spreadsheet program, or spreadsheet data including lists, can be analyzed in a data summary table.

With spreadsheets that include a significant amount of data, it can be difficult for the user to select the desired data upon which to be included in such reports as data summary tables. For example, the volume of data provided across one or more largely unstructured spreadsheets can overwhelm the user, making it difficult to find the pieces of data relevant for a specific reporting scenario.

SUMMARY

In one aspect, a system for creating a report in a spreadsheet includes: a central processing unit; and a memory encoding instructions that, when executed by the central processing unit, cause the central processing unit to create: a data source module programmed to identify sources of data items associated with the spreadsheet; an active module programmed to identify which of the data items are associated with the report that is generated in the spreadsheet; and a display module programmed to display on a field pane with an active tab and an all tab, the active tab displaying those data items that are determined to be associated with the report that is being generated in the spreadsheet, and the all tab displaying all of the data items associated with the spreadsheet.

In another aspect, a method for generating a user interface for a spreadsheet includes: identifying, by a computing device, a source for all data items associated with the spreadsheet; identifying which of the data items are associated with the report that is generated in the spreadsheet; and displaying an active tab and an all tab on a field pane, the active tab listing those data items that are determined to be associated with the report that is being generated in the spreadsheet, and the all tab listing all of the data items associated with the spreadsheet.

In yet another aspect, a method for generating a field pane for use in creating a data summary table in a spreadsheet includes: identifying, by a computing device, a table and associated dimensions for each of the data items associated with the spreadsheet, the data items including data regions on the spreadsheet and data from external data stores; identifying which of the dimensions are incorporated into the data summary table in the spreadsheet; displaying an active tab listing all of the tables and associated dimensions for those dimensions that are included in the data summary table, the tables being displayed in an expanded format to show at least a portion of the dimensions associated with each table; allowing a user to select an all tab; and upon selection, displaying the all tab listing all of the tables and associated dimensions in the spreadsheet, the tables being displayed in a collapsed format so that columns are hidden.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DETAILED DESCRIPTION

The present application is directed to systems and methods for providing contextually-relevant data to a user when generating reports. In examples described herein, data sources are presented to the user based on the context in which a report is being generated. In some examples, user interactions with the data are recorded, and presentation of the data to the user is modified in response to the interaction.

Figure 1:
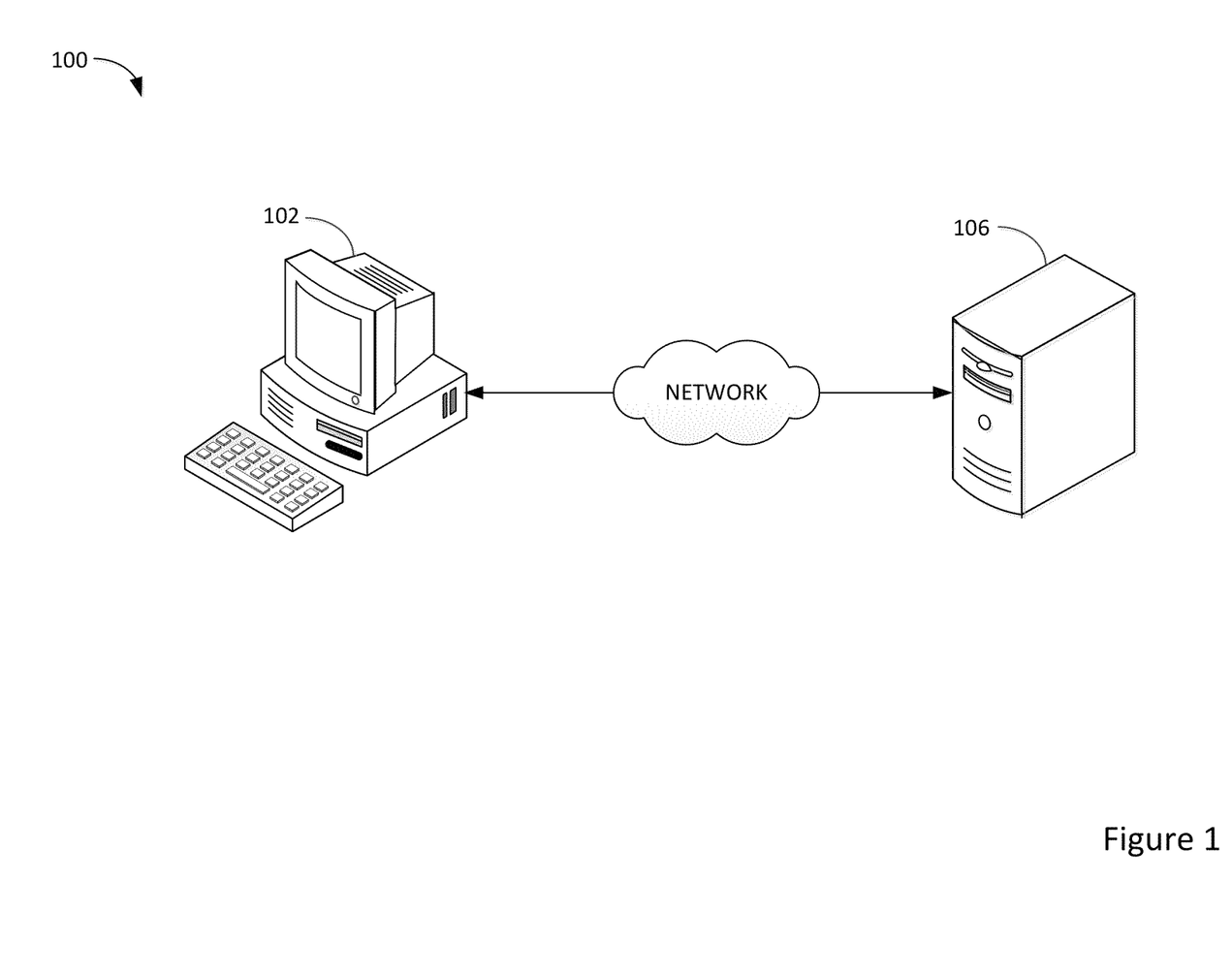
FIG. 1 shows an example system for generating a report in a spreadsheet program.

FIG. 1 shows an example system 100 that supports the generation of one or more reports based upon data provided in a spreadsheet application. The system 100 includes a client computer 102 and a server computer 106. The client computer 102 is connected to the server computer 106 across a network, typically a corporate Intranet or the Internet. More or fewer client computers, server computers or other computing devices may be used.

As described further below, the client computer 102 can connect to the server computer 106 to obtain data, such as a spreadsheet file. The client computer 102 can execute a native spreadsheet application on the client computer 102 to manipulate the spreadsheet file. In another example, the client computer 102 can utilize one or more applications hosted on the server 106 to access and manipulate the spreadsheet file. Other configurations are possible.

Figure 2:
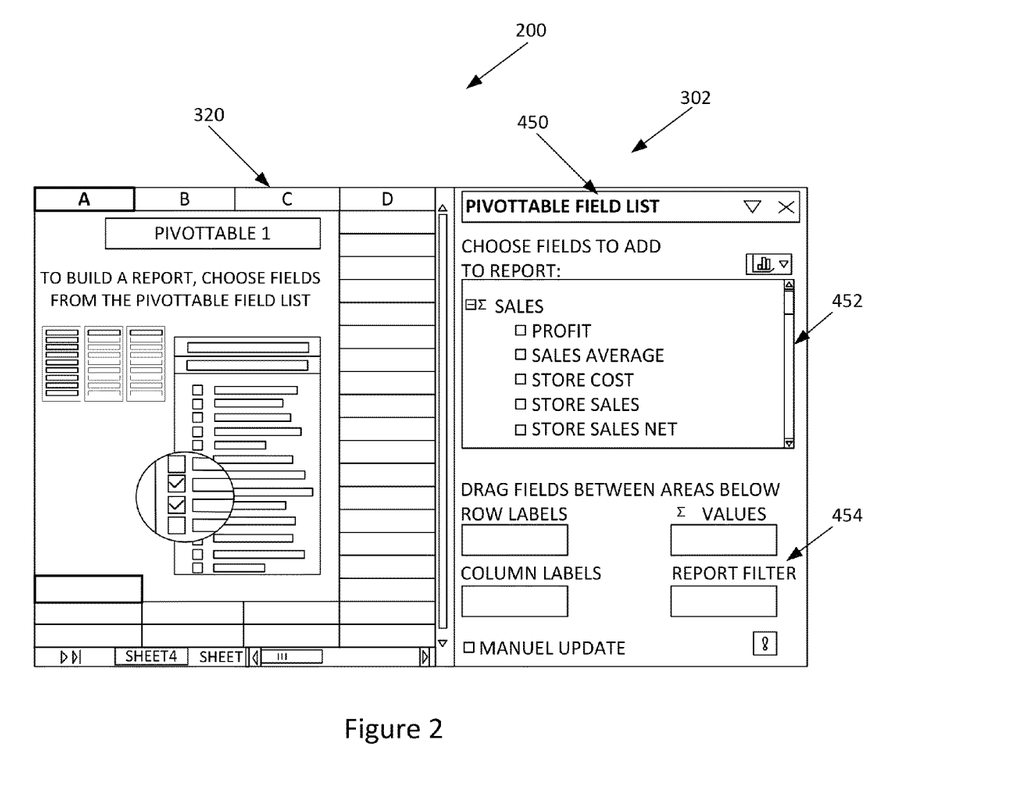
FIG. 2 shows an example pivot table in a spreadsheet.

Referring now to FIG. 2, an example program 200 is shown. In this example, the program 200 is Microsoft's EXCEL spreadsheet software program running on a computer system, such as the computer system 100 described above. The program 200 includes a spreadsheet with an example list of data.

A user can create one or more reports based on the data within the spreadsheet. In some examples described herein, the report can be a data summary table. However, in other examples, the report can simply be another "regular" table. For example, the systems and methods described herein can be used to suggest certain columns for a table created by the user based on associations identified with other tables in the spreadsheet.

Figure 3:
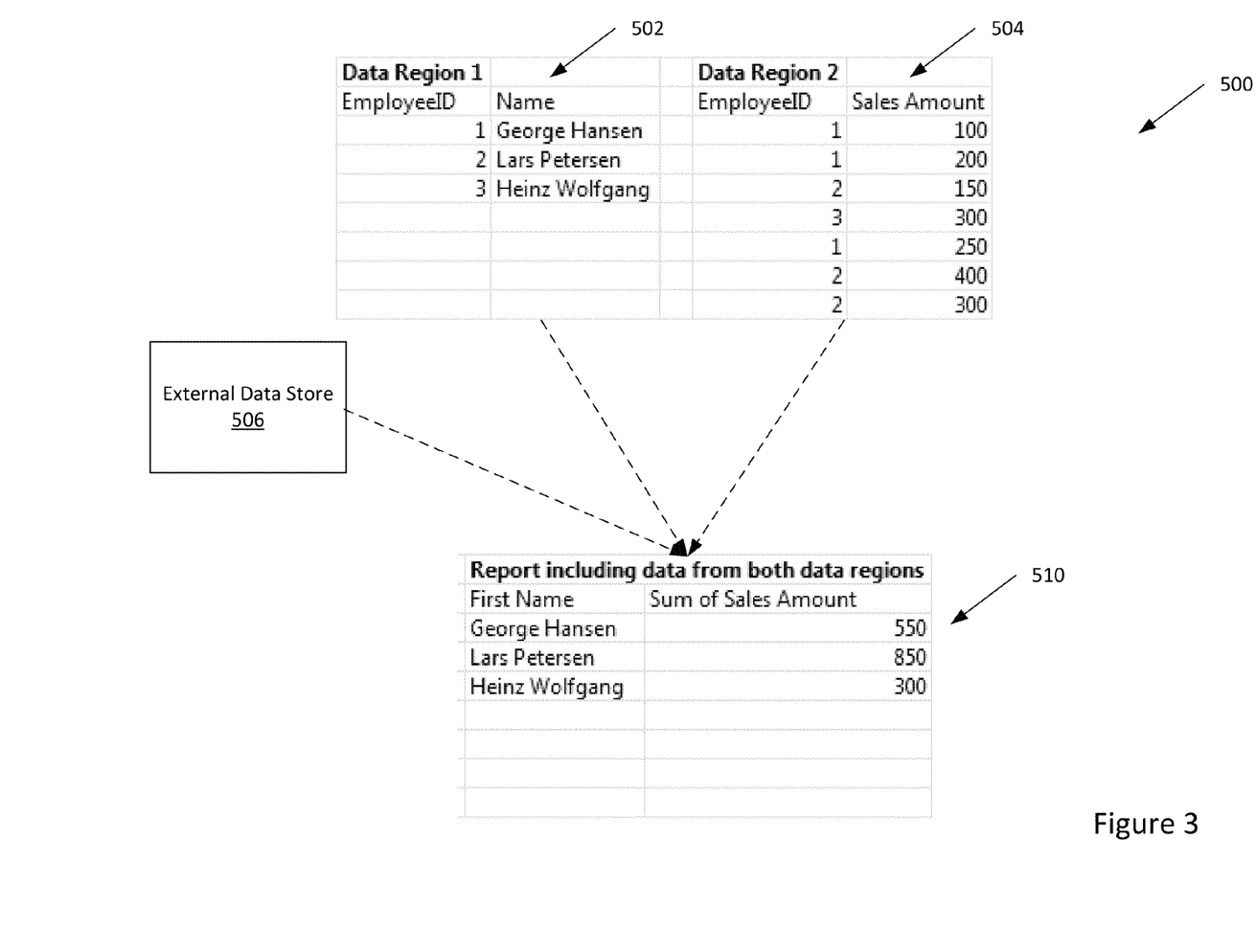
FIG. 3 shows example data regions used to generate a pivot table in a spreadsheet.

For example, an example user interface 302 of program 200 is shown. The user interface 302 includes an initial data summary table 320 (The data summary table 320 is blank in FIG. 3). The data summary table 320 can be created from data from various sources. In one example as shown in FIG. 3, the data summary table 320 can be created from data provided within the spreadsheet file or from one or more external data stores.

The user interface 302 of the program 200 also includes an example task pane 450 that can be used to create and modify the data summary table 320. For example, the task pane 450 includes a list of the data fields from data associated with the spreadsheet file. The user can select and deselect fields from the task pane 450 to create the data summary table 320.

The task pane 450 generally includes a field pane 452 and a layout pane 454. The field pane 452 includes a list of the data fields available in the spreadsheet. When a data field in the list is added to the layout pane 454 as described below, the checkbox associated with the data field is checked.

The layout pane 454 includes a plurality of zones that represent aspects of the data summary table 320 that is created using the task pane 450. For example, the layout pane 454 includes a row zone, a column zone, a value zone, and a filter zone. The row zone defines the row labels for the resulting data summary table 320. The column zone defines the column labels for data summary table 320. The value zone identifies the data that is summarized (e.g., aggregation (sum, count, average, standard deviation, etc.), variation, etc.) on data summary table 320. The Filter zone allows for the selection of filtering that is applied to all other fields in the other zones.

One or more of the data fields from field pane 452 are added to one or more of the zones of layout pane 454 to create and modify the data summary table 320. In the example shown, the user can click, drag, and drop a data field from the list in the field pane 452 to one of the zones of the layout pane 454 to add a field to the data summary table 320.

Referring now to FIG. 3, the data used to create a report, such as the data summary table 320, can come from multiple sources. The sources of data can be internal to a spreadsheet, as well as external.

For example, a spreadsheet 500 shown in FIG. 3 includes two internal data regions 502 and 504. Data regions are defined sets of data having at least two dimensions, such as rows and columns. For example, the data region 502 includes columns EmployeeID, Name, and rows 1-3. Similarly, the data region 504 includes columns EmployeeID, Sales Amount, and rows 1-7. Logic that can be used to automatically identify relationships between data regions within a spreadsheet is described in U.S. patent application Ser. No. 13/252,450, titled "Automatic Relationship Detection For Reporting On Spreadsheet Data," filed on even date herewith, the entirety of which is hereby incorporated by reference.

In addition to internal data sources, an external data store 506 is accessed to obtain data for the report. External data stores can include, for example, OLAP and non-OLAP data sources. Other types of external data sources are possible.

The data on the spreadsheet 500 and the external data stores are used to generate a report 510 on the spreadsheet 500. In this example, the report 510 is a data summary table, such as a pivot table, generated using the data from the data regions 502, 504. To create the report 510, the user selects desired data columns from the data regions 502, 504 and the external data store 506 in a manner similar to that described in FIG. 2.

In some examples, the number of available data fields provided in the data regions and external data stores from which the user can select becomes voluminous. In such scenarios, it can be difficult for the user to review the available data fields and select the desired fields for inclusion in a report.

Figure 4:
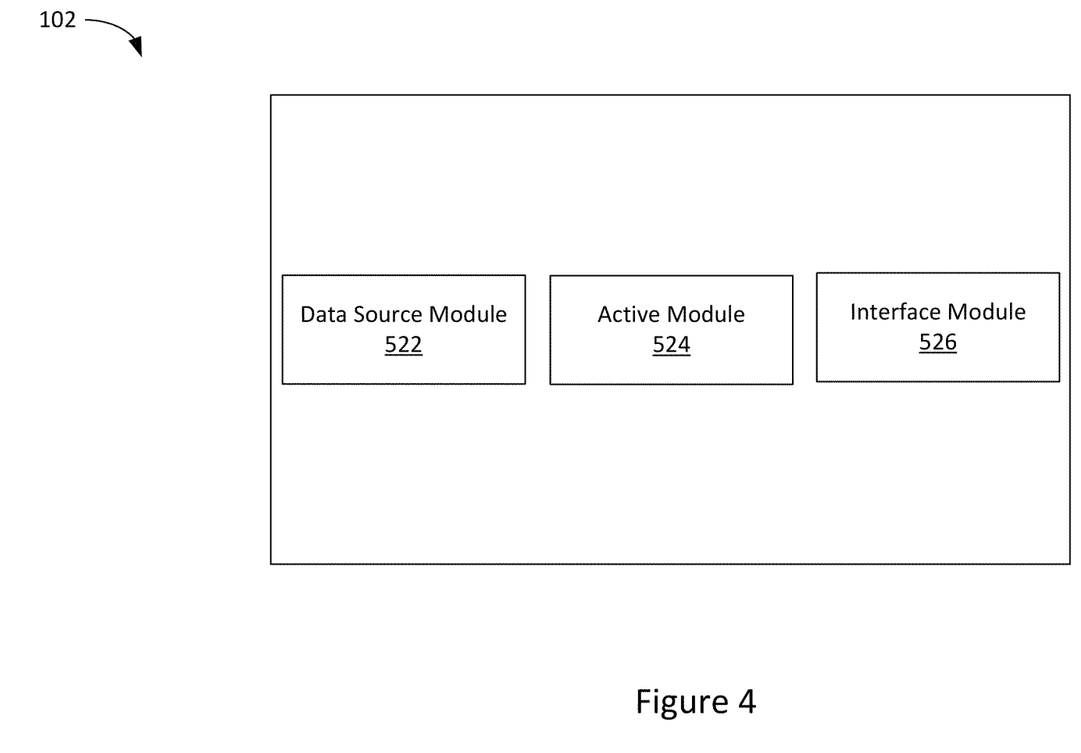
FIG. 4 shows example modules of a client computing device of the system of FIG. 1.

Referring now to FIG. 4, logical modules of the client computer 102 are shown. These modules include a data source module 522, an active module 524, and an interface module 526. In these examples, the modules 522, 524, 526 are executed in conjunction with the spreadsheet application that allows the user to manipulate data within spreadsheet files. The modules 522, 524, 526 of the client computer 102 function to reduce the number of data fields that are presented to the user to possibly identify the relevant fields that the user may want to select when creating a report.

The data source module 522 identifies all data sources associated with a particular file, such as a spreadsheet file. This can include internal data regions defined on one or more sheets of the spreadsheet file. This can also include data from external data stores. Such external data stores can include data that is referenced from within the spreadsheet, such as external data that has been incorporated into the spreadsheet file. The data source module 522 provides all of the data sources to the active module 524 for analysis.

The active module 524 determines which, if any, of the data sources are likely to be relevant to the user based upon the user's current context. For example, if the user is creating a report, such as a pivot table, and has selected data fields from two data regions within a spreadsheet, the active module 524 determines that all of the data fields associated with these two data regions may be relevant to the user. In addition, if the user has incorporated data from an external data store, the active module 524 determines that the data fields associated with the external data store may be relevant to the user. This could include a subset of the external data store based on relationships and/or heuristics performed by the system.

On the other hand, other data within the spreadsheet that has not been incorporated into the spreadsheet may not be relevant for the user. In this scenario, the active module 524 excludes the data fields associated with these data sources so that the user is not inundated with data fields for selection.

The interface module 526 presents the available data fields to the user for inclusion in the report. In this example, the interface module 526 segregates the "active" data fields from those that are not active based on the analysis performed by the active module 524.

For example, for those data fields associated with data regions that have already been incorporated into the report, the interface module 526 presents the data fields associated with these data regions or external data stores to the user on an "Active" tab, as described below. Conversely, for those data fields that are associated with data regions or external stores that are not already associated with the report, the interface module 526 presents those data fields on an "All" tab.

Figure 5:
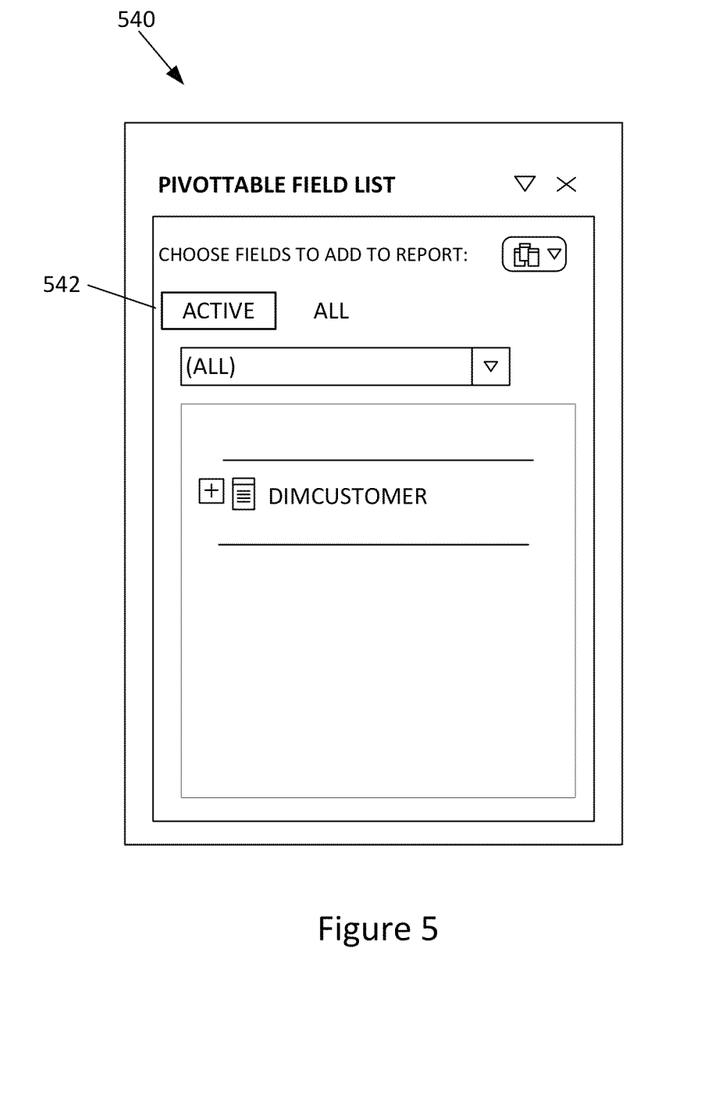
FIG. 5 shows an example field pane.
Figure 6:
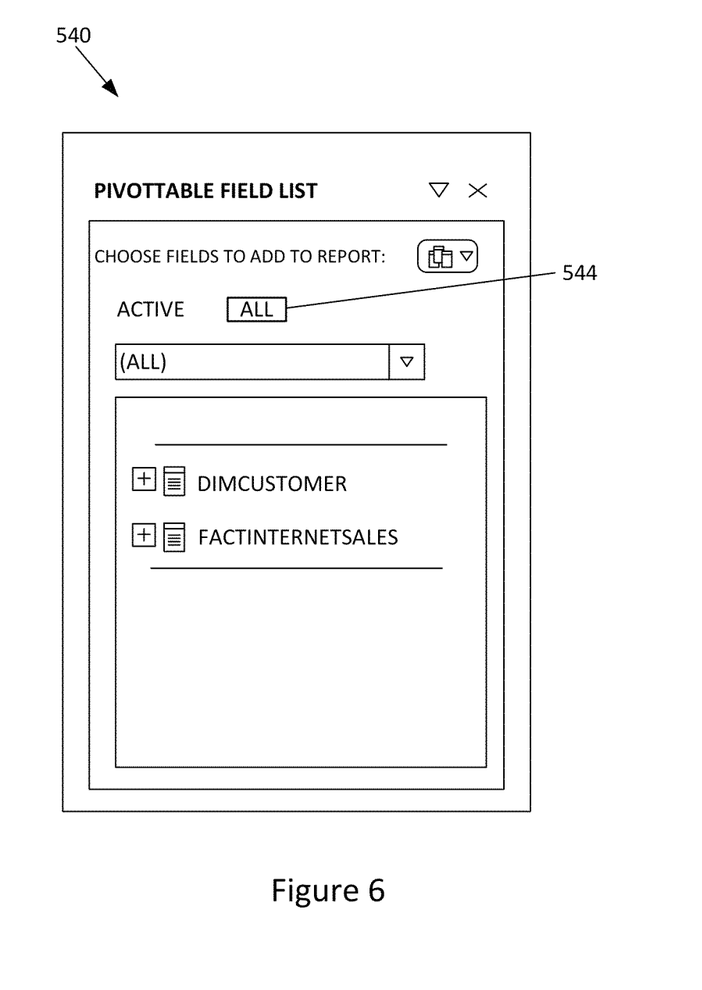
FIG. 6 shows another view of the field pane of FIG. 5.

For example, referring now to FIGS. 5 and 6, another field pane 540 is shown. In FIG. 5, an active tab 542 is selected. When the active tab 542 is selected, data fields that are "active" in the report are listed in the field pane 540. As noted above, data fields are considered active if the fields are associated with one or more data regions or external data stores that are incorporated into the report. In this example, a single data field "DimCustomer" is associated with the report and is therefore listed on the active tab 542.

Referring now to FIG. 6, an all tab 544 is selected on the field pane 540. When selected, all fields available in the spreadsheet and any associated external data stores are listed.

In this example, the data field DimCustomer is listed again, since it is an available data field in the spreadsheet. In addition, a data field FactInternetSales is also listed. This field is not associated with any data region or external data store that is incorporated into the report. However, the data field FactInternetSales is associated with some data region or external data store associated with the spreadsheet within which the report is being generated.

While the example only provides a limited number of data fields, the number of data fields available (as well as subfields as described below) can grow significantly, making it difficult for the user to locate and select relevant fields for inclusion in the report. The active tab 542 addresses this issue by providing only those data fields that may be most relevant and desired by the user.

In this example, the active tab 542 is the default tab when the user selects the field pane 540. However, if no fields have been added to the report, and the active tab 542 is therefore blank, then the all tab 544 is used as the default tab. When the active tab 542 is blank, a message can be provided to the user, such as: "There are currently no fields to display in the Active Tab. Selecting fields in the All Tab will automatically add them to the Active Tab." The user can move between the active tab 542 and the all tab 544 by selecting the tabs with an input device, such as a mouse, keyboard, touch, etc.

As the user adds and removes data from the report, different data fields can be added and removed from the active tab 542. For example, if the user adds a data field associated with a data region not previously listed on the active tab 542, a table (i.e., a top-level data field, as described below) associated with that data region can be added to the active tab 542. In some examples, a delay is instituted before a table is added to the active tab 542 to allow the user to experiment with the addition and removal of data from the report without having the list of tables in the active tab 542 jump around significantly.

In addition, in some examples, the user can manually add a table to the active tab 542 even if no data fields associated with that table are included in the report. For example, the user can select a table listed in the all tab 544 and indicate through selection of a menu item (e.g., "Add to Active Tab") the desire to include that table in the active tab 542 for easy referral and selection.

Figure 7:
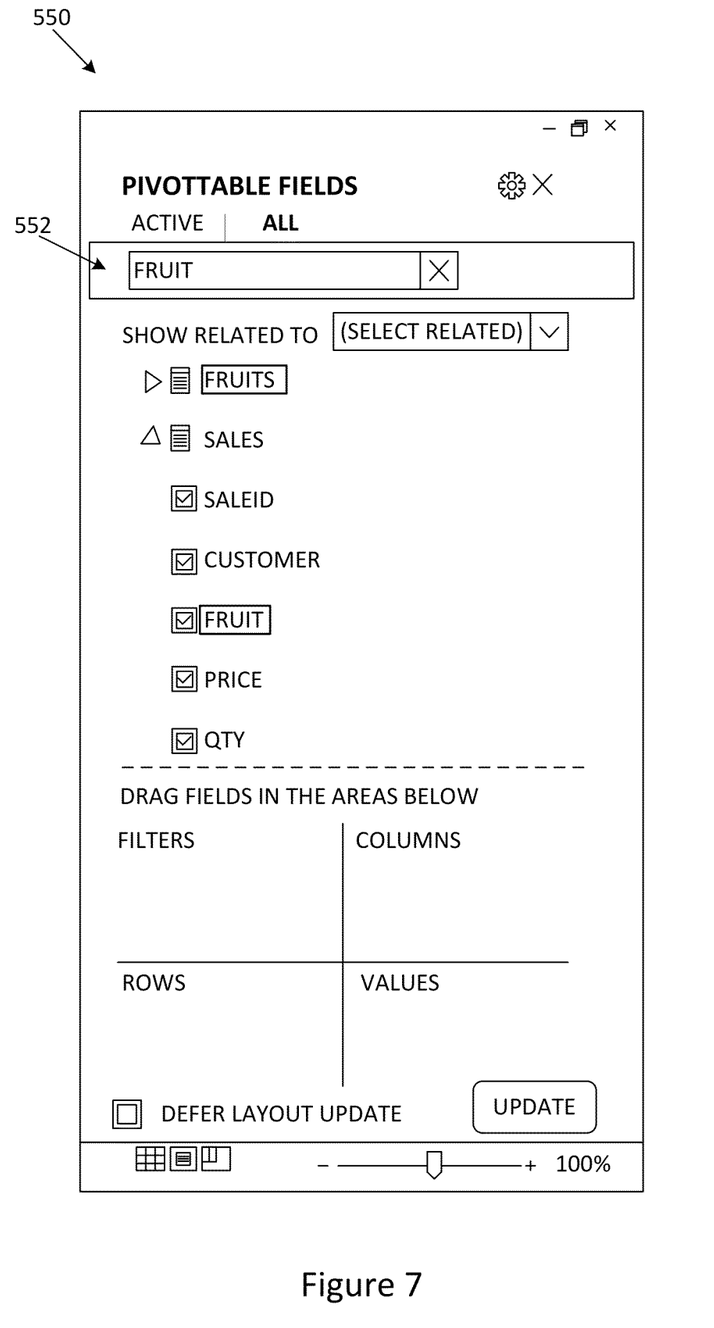
FIG. 7 shows another example field pane.

Referring now to FIG. 7, another example field pane 550 is shown. In this example, the all tab is selected. The field pane 550 lists different types of data fields. In this example, the top level data fields, referred to as tables, are Fruits and Sales. The lower level fields, referred to as dimensions, are shown for the Sales table, including SaleID, Customer, Fruit, Price, and Qty. The dimensions associated with each table in the list can be expanded and collapsed by the user as desired.

By default, all of the tables will be expanded in the active tab of the field list. In this example, dimensions are expanded only at the first level, and the subsequent levels remain collapsed (i.e., hidden). For the all tab, all tables are shown in the collapsed state by default. The user can manually expand any desired tables within the all tab.

In addition, the field pane 550 includes a query box 552 that allows the user to put one or more keywords into the query box to search for certain tables or dimensions. For example, in the embodiment shown, the keyword "fruit" is placed in the query box 552, and the Fruit dimension is highlighted for the user upon completion of the query. This allows the user to quickly identify desired fields within the field pane.

The tables and associated dimensions in the field pane can be listed in various orders. In one example, the tables are listed in alphabetical order, and the dimensions are nested under each table in alphabetical order. In another example, tables are grouped according to relationships. For example, data associated with a report can be accessed from various sources within the spreadsheet, as noted above. In examples where data is accessed from various sources, these sources can be grouped or clustered according to common associations.

Figure 8:
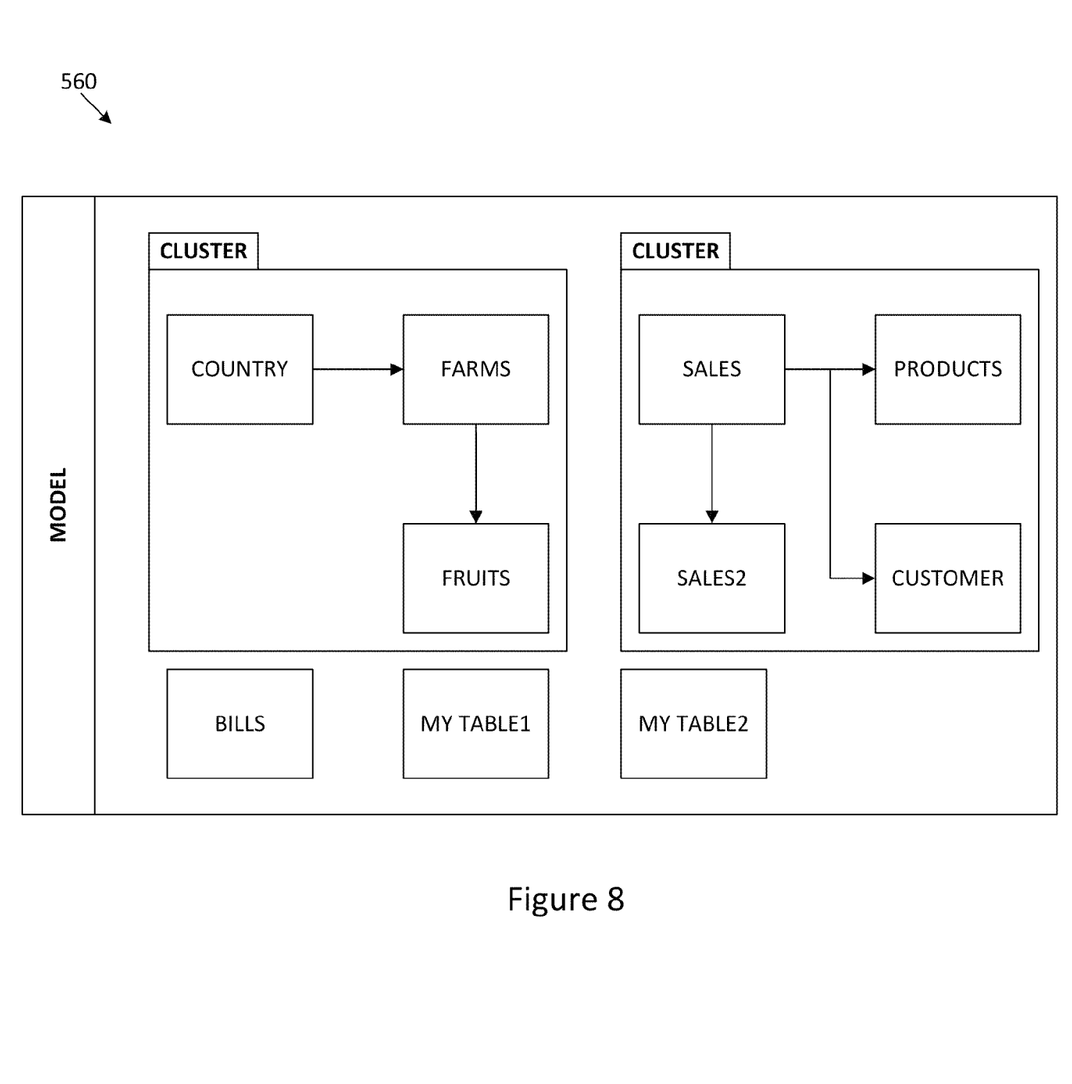
FIG. 8 shows relationships between example tables in a spreadsheet program.

For example, referring now to FIG. 8, a model 560 visually depicts the data sources for a report. Some of the data sources are related and are therefore shown in clusters.

Figure 9:
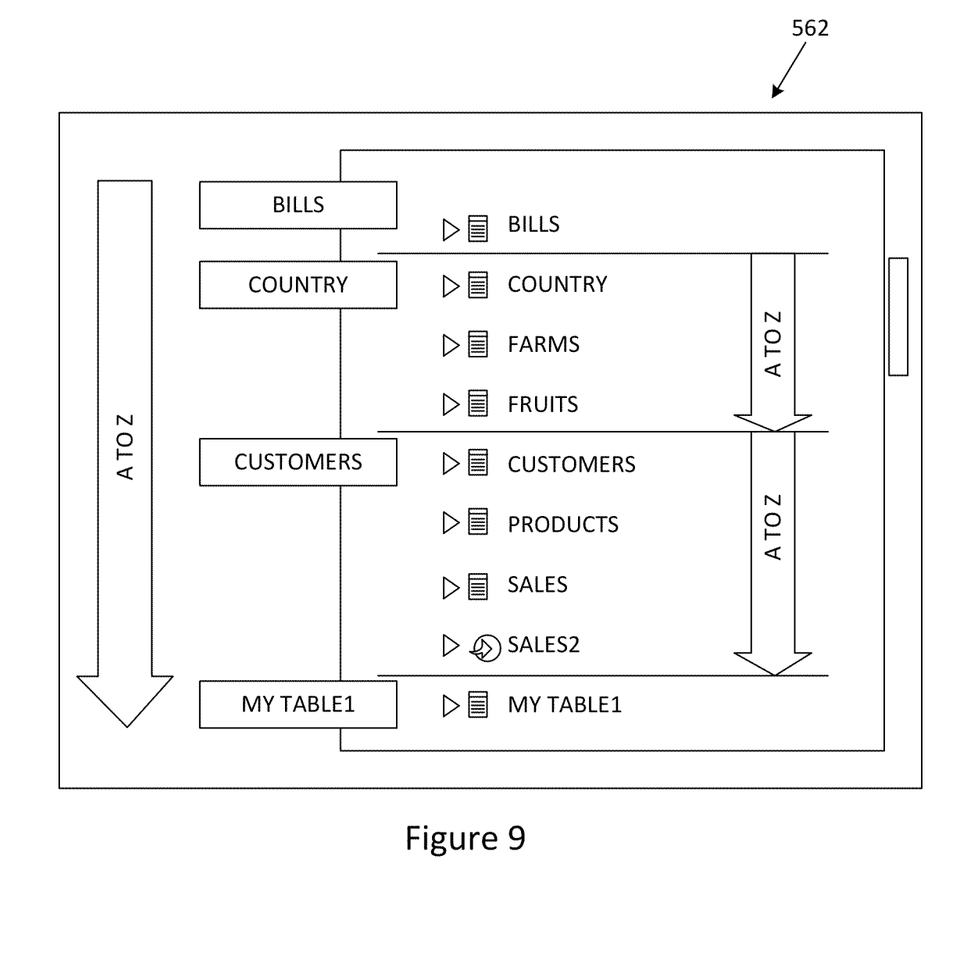
FIG. 9 shows a portion of an example field pane based upon the tables shown in FIG. 8.

Referring now to FIG. 9, a portion of a field pane 562 is shown including the data fields from the model 560 depicted in FIG. 8. The tables listed in the field pane 562 are listed in clusters, with the data fields Country, Farms, and Fruits being one cluster, and the data fields Customer, Products, Sales, and Sales2 being another cluster. Each cluster is separated. Within each cluster, the fields are listed in A to Z order. Different configurations are possible.

Figure 10:
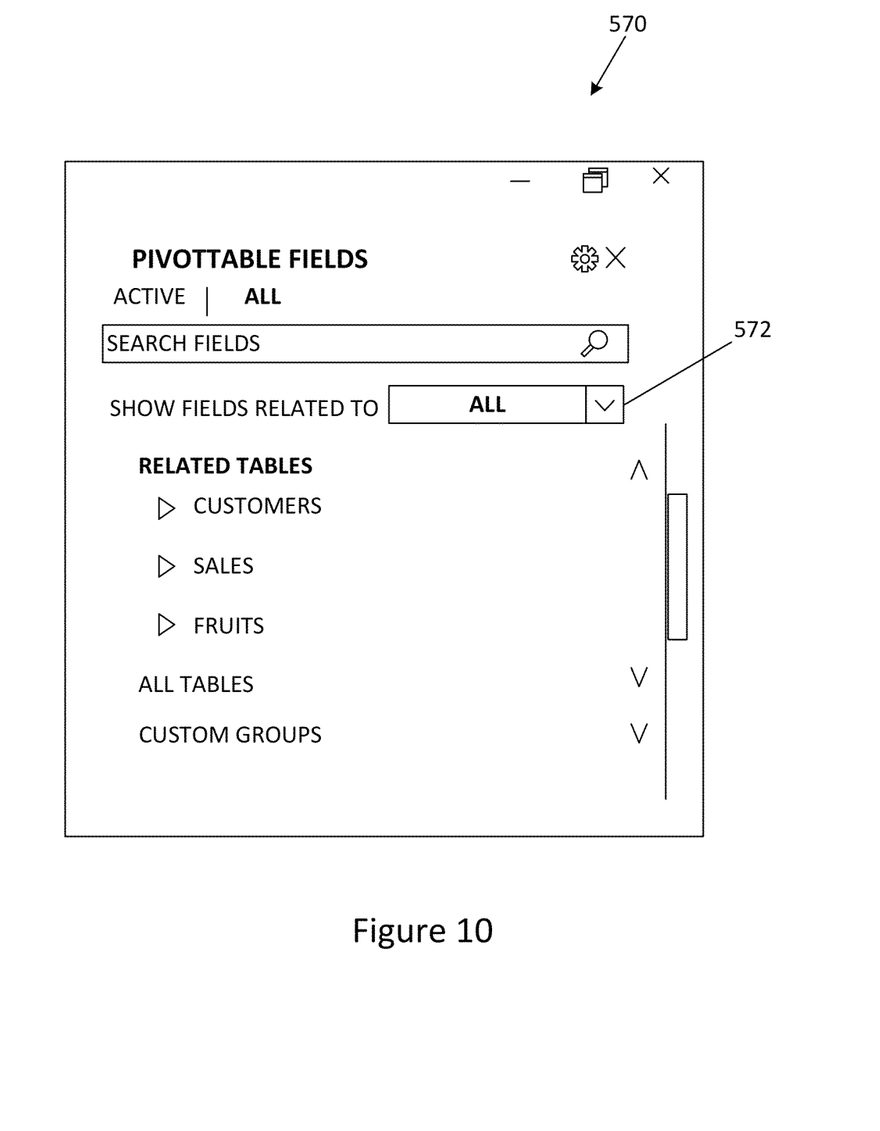
FIG. 10 shows a portion of another example field pane.

The user can define how the data fields are arranged on the field pane by selecting items in a dropdown menu 572 shown for field pane 570 shown in FIG. 10. The dropdown menu 572 can include the following items: (i) all—which shows all of the relevant tables; (ii) perspective—which shows tables available in the perspective; and (iii) table—which shows only those tables related to the selected table.

In the alternative shown in FIG. 10, the tables are grouped into related tables and all tables. In this example, the tables that include data fields associated with the report are listed in the related tables group in an expanded arrangement, and the unrelated tables are listed in the all tables group in collapsed format.

Other configurations are possible. For example, in another embodiment, the field pane can be configured to list related tables based on heuristics that analyze data region content and predict which data regions include data that may be related. These data regions can be clustered regardless of whether or not data fields from the data regions have been added to the report. Examples of such heuristics are described in U.S. patent application Ser. No. 13/252,450, entitled "Automatic Relationship Detection For Reporting On Spreadsheet Data," filed on even date herewith.

In addition to listing the tables in alphabetical order, the lists can be provided in other formats, such as by data source order. Other configurations are also possible.

Figure 11:
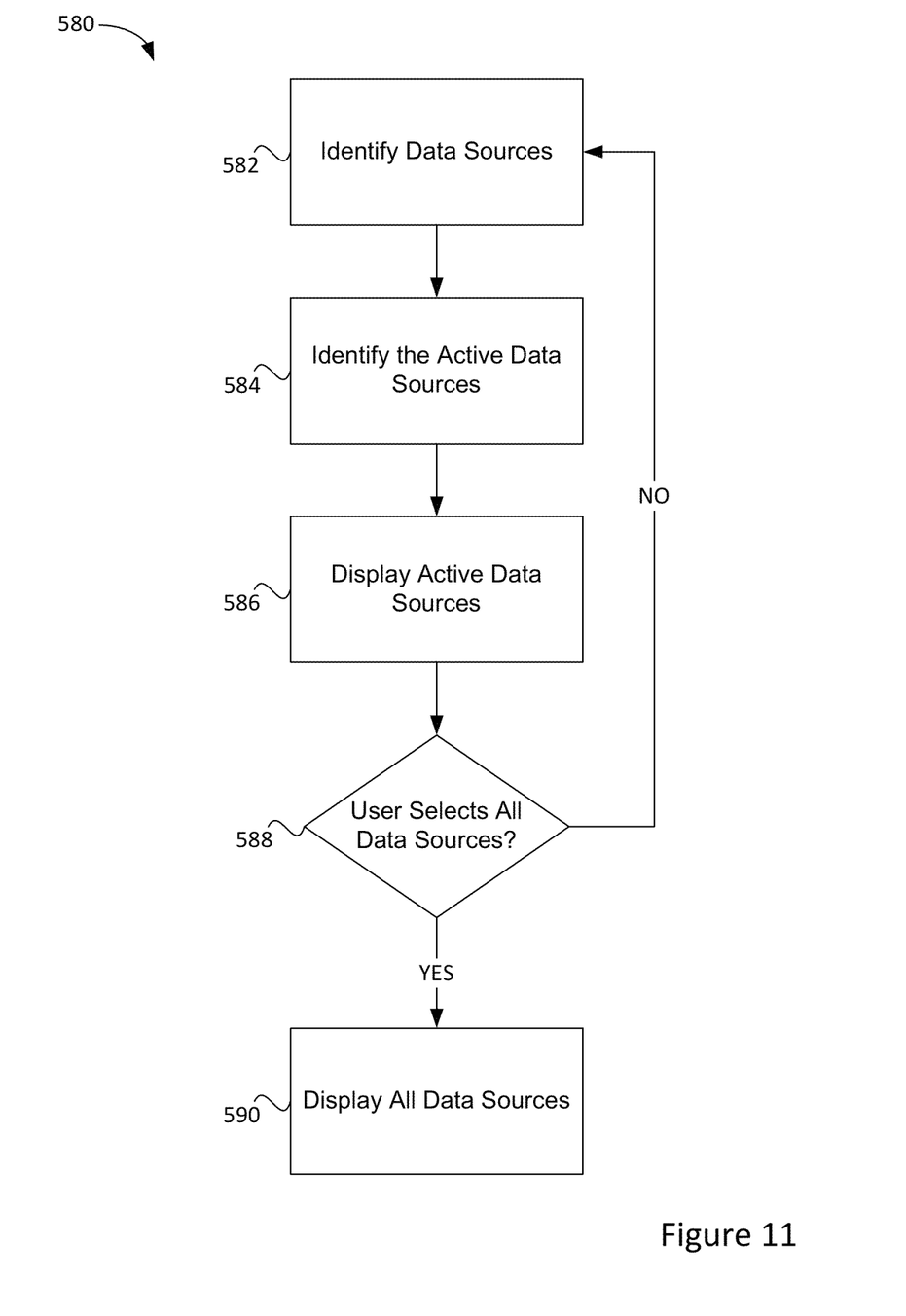
FIG. 11 shows an example method for displaying data fields available for inclusion in a report.

Referring now to FIG. 11, an example method 580 for displaying data fields available for inclusion in a report is shown.

Initially, at operation 582, the data sources associated with a spreadsheet are identified. As previously noted, these data sources can include data regions within the spreadsheet, as well as external data stores that have been incorporated into the spreadsheet.

Next, at operation 584, the active data sources are identified. The active data sources are those data fields associated with the data regions and/or external data stores that are associated with the user's report.

Next, at operation 586, the active data sources are displayed to the user, such as on the active tab described above. The user can select fields associated with these sources for inclusion in the report.

Next, a determination is made at operation 590 regarding whether or not the user has selected to show all data sources, such as by selecting the all tab described above. If so, control is passed to operation 590, and all data sources associated with the spreadsheet are shown. If not, control is instead passed back to operation 582.

Figure 12:
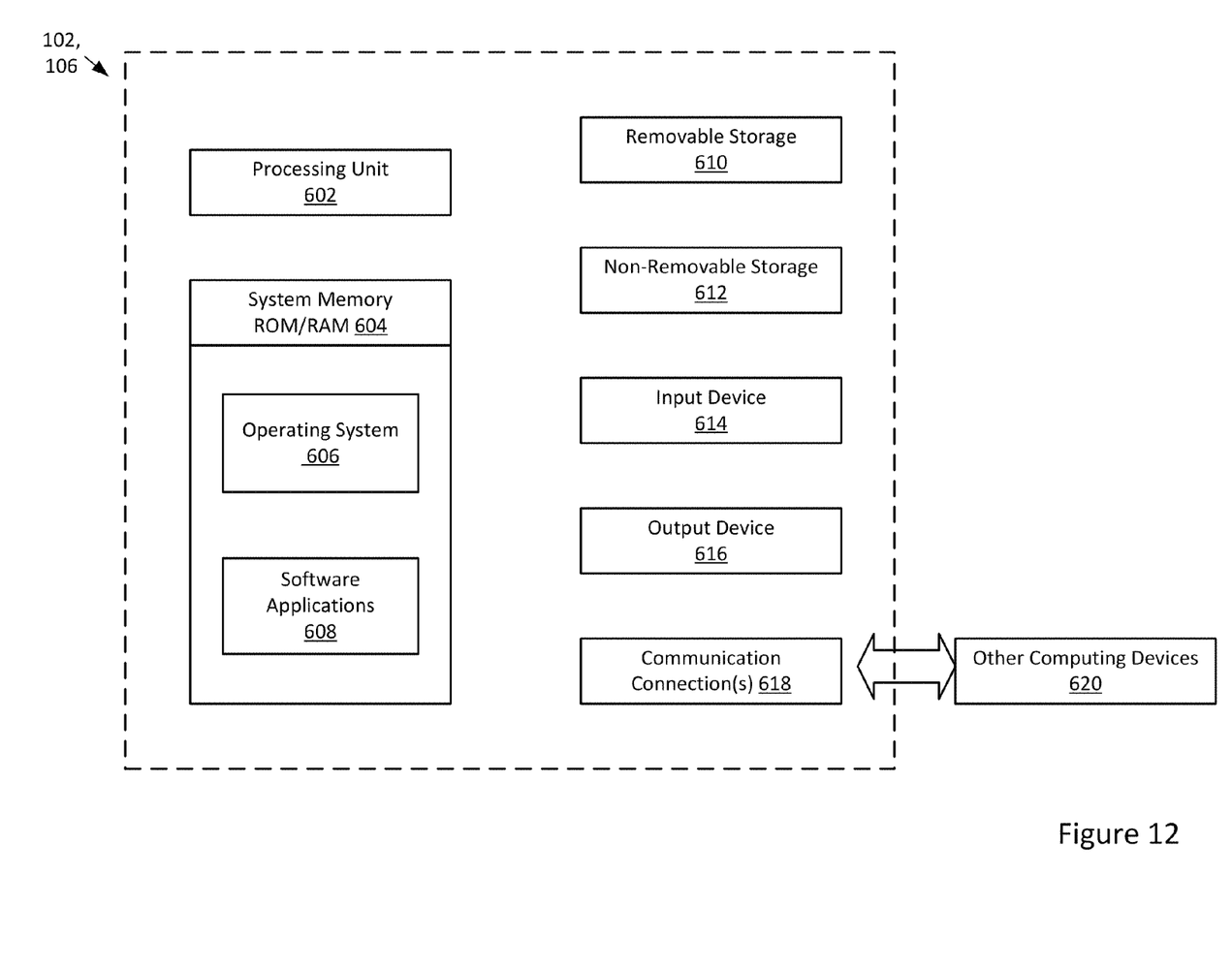
FIG. 12 shows example components of computing devices shown in FIG. 1.

With reference to FIG. 12, example components of the client computer 102 and the server computer 106 are shown. In example embodiments, the client computer 102 and the server computer 106 are computing devices. The client computer 102 and server computer 106 can include input/output devices, a central processing unit ("CPU"), a data storage device, and a network device. The client computer 102 can also be a mobile computing device, such as a laptop, tablet, convertible, or other handheld device like a smartphone or cellular telephone. The server computer 106 can also be incorporated as one or more server computers in a network of servers. In such a scenario, the network can provide a cloud computing platform in which one or more applications and data are hosted for clients connecting to the cloud computing platform. The discussion below regarding the server computer 106 also applies to the components of the client computer 102.

In a basic configuration, the server computer 106 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of a server, such as the Microsoft SharePoint® Server 2010 collaboration server, from Microsoft Corporation of Redmond, Wash. The system memory 604 may also include one or more software applications 608 and may include program data.

The server computer 106 may have additional features or functionality. For example, server computer 106 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 6 by removable storage 610 and non-removable storage 612. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 106. Any such computer readable storage media may be part of server computer 106. Server computer 106 may also have input device(s) 614 such as keyboard, mouse, pen, voice input device, touch input device, etc. Output device(s) 616 such as a display, speakers, printer, etc. may also be included.

Consistent with embodiments of the present disclosure, the input device(s) 614 may comprise any motion detection device capable of detecting the movement or gesture of a user. For example, the input device(s) 614 may comprise a Kinect® motion capture device, from Microsoft Corporation, comprising a plurality of cameras and a plurality of microphones.

The server computer 106 may also contain communication connections 618 that allow the device to communicate with other computing devices 620, such as over a network in a distributed computing environment, for example, an intranet or the Internet. Communication connections 618 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 6 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the computing devices 102 and 106 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:

1. A system for creating a report in a spreadsheet, the system comprising:
   a central processing unit; and
   a memory encoding instructions that, when executed by the central processing unit, cause the central processing unit to create:
     a data source module programmed to identify sources of data items associated with the spreadsheet;
     an active module programmed to generate the report including a portion of the data items associated with the spreadsheet, and identify which of the data items are associated with the report; and
     a display module programmed to display a field pane to modify the report, the field pane including an active tab and an all tab, the active tab displaying those data items that are determined to be associated with the report, and the all tab displaying all of the data items associated with the spreadsheet.

2. The system of claim 1, wherein the data items include data fields associated with one or more data regions of the spreadsheet.

3. The system of claim 1, wherein the data items include data fields associated with one or more external data stores incorporated into the spreadsheet.

4. The system of claim 1, wherein the data items include one or more tables, and each of the one or more tables includes two or more dimensions.

5. The system of claim 4, wherein the one or more tables are shown by default in a collapsed format in the all tab.

6. The system of claim 4, wherein the one or more tables are shown by default in an expanded format in the active tab.

7. The system of claim 4, wherein related tables are clustered on the field pane.

8. The system of claim 1, wherein a user can select the active tab and the all tab to switch between views provided by the display module.

9. The system of claim 1, wherein a data item is added to the active tab when a field associated with the data item is added to the report.

10. A method for generating a user interface for a spreadsheet, the method comprising:
identifying, by a computing device, a source for all data items associated with the spreadsheet;
generating a report including a portion of the data items associated with the spreadsheet;
identifying which of the data items are associated with the report; and
displaying a field pane to modify the report, the field pane including an active tab and an all tab, the active tab listing those data items that are determined to be associated with the report, and the all tab listing all of the data items associated with the spreadsheet.

11. The method of claim 10, wherein the data items include data fields associated with one or more data regions of the spreadsheet.

12. The method of claim 10, wherein the data items include data fields associated with one or more external stores incorporated into the spreadsheet.

13. The method of claim 10, wherein the data items include one or more tables, and each of the one or more tables includes two or more dimensions.

14. The method of claim 13, wherein the one or more tables are shown by default in a collapsed format in the all tab.

15. The method of claim 13, wherein the one or more tables are shown by default in an expanded format in the active tab.

16. The method of claim 13, further comprising clustering related tables on the field pane.

17. The method of claim 10, further comprising allowing a user to select the active tab and the all tab to switch between views.

18. The method of claim 10, further comprising:
allowing a data item to be added to the report; and
adding the data item to the active tab.

19. A method for generating a field pane for use in creating a report in a spreadsheet, the method comprising:
identifying, by a computing device, data regions and associated dimensions for data items associated with the spreadsheet, the data items including data from the spreadsheet and data from external data stores;
receiving a selection of associated dimensions to be included in a report;
generating the report including the associated dimensions;
identifying which of the associated dimensions are incorporated into the report;
displaying the field pane to modify the report, the field pane including an active tab and an all tab, the active tab listing all of the associated dimensions that are selected to be included in the report, the data regions being displayed in an expanded format to show at least a portion of the dimensions associated with each data region;
allowing a user to select the all tab; and
upon selection, displaying the all tab listing all of the data regions and the associated dimensions in the spreadsheet, the data regions being displayed in a collapsed format so that the dimensions are hidden.

20. The method of claim 19, further comprising:
allowing the user to add a data item to the report; and
adding the associated dimensions of the data item to the active tab.

* * * * *